Sept. 6, 1966            R. S. COLBY            3,270,839

DEVICE FOR PREVENTING MULTIPLE REBOUNDS OF AN IMPACTING MASS

Original Filed Dec. 28, 1961            2 Sheets-Sheet 1

RALPH S. COLBY
INVENTOR.

BY Alden D. Redfield

ATTORNEYS

Sept. 6, 1966  R. S. COLBY  3,270,839
DEVICE FOR PREVENTING MULTIPLE REBOUNDS OF AN IMPACTING MASS
Original Filed Dec. 28, 1961  2 Sheets-Sheet 2

RALPH S. COLBY
INVENTOR

BY Alden D. Redfield
Aubrey C. Brine

ATTORNEYS

United States Patent Office 3,270,839
Patented Sept. 6, 1966

3,270,839
DEVICE FOR PREVENTING MULTIPLE REBOUNDS OF AN IMPACTING MASS
Ralph S. Colby, Boxford, Mass., assignor to Avco Corporation, Cincinnati, Ohio, a corporation of Delaware
Original application Dec. 28, 1961, Ser. No. 162,705, now Patent No. 3,209,580. Divided and this application Mar. 16, 1965, Ser. No. 452,959
18 Claims. (Cl. 188—96)

This application is a division of the copending application Serial No. 162,705, filed December 28, 1961, now Patent No. 3,209,580, and assigned to the assignee of the present invention.

This invention relates generally to devices for preventing multiple rebounding of masses that are first accelerated and subsequently rapidly decelerated to rest by means of an impact. In particular, this invention relates to a device which neutralizes the propelling force of the mass with the result that after the first rebound the mass is brought to rest above the impact point.

For purposes of this discussion, the term "mass" is defined to include all component parts that are caused to impact. For example, in a vertical free-fall shock testing machine, of the type described in Patent No. 2,955,-456, the mass would include the machine carriage as well as the test specimen mounted to the carriage to be shock tested. This invention has been applied with great success to an industrial shock testing machine. It will be discussed in this environment.

In the shock testing machine art, designers have gone to great lengths to design equipment and impact devices which would allow them to subject equipment to a predetermined type of shock impulser, such as a square wave, saw tooth and half-sine shock impulses, at desired and controllable shock amplitudes. Multiple rebounding is undesirable and to be avoided.

Multiple rebounding in connection with such machines as forges and drop hammers is also undesirable since they often distort the contour of the piece being formed.

There are numerous purely mechanical methods for preventing multiple rebounds. A pneumatic procedure for this purpose has been described and claimed in a co-pending application to Kohli, Serial No. 60,184, filed on October 3, 1960, and assigned to the assignee of the present application. Both prior art methods have been used successfully in conjunction with small machines, i.e., machines having small masses in the order of 300 lbs. or less. There is a long-felt need, however, for a more reliable device for preventing multiple rebounds in large impact machines, with impact masses of 500 lbs. or more.

It is an object of the invention to provide a device for preventing multiple rebounds of impacting masses which avoids the disadvantages and limitations of prior art devices.

It is still another object of the invention to provide a device for preventing multiple rebounding of impacting masses which uses a simply constructed, inexpensive fluid actuated means.

It is yet another object of the invention to provide a device for preventing multiple rebounds of impacting masses which act to substantially neutralize the force propelling the mass to impact.

It is yet another object of the invention to provide devices for preventing multiple rebounds of impacting masses which act on the mass prior to its initial impact and thereafter through impact without having deleterious effects on the reliability and predictability of the impact produced.

In accordance with the invention, in combination with a means for providing a propelling force to a mass to propel the mass to impact, a device for preventing multiple rebounds of the mass after its initial impact comprises an air cylinder which includes a reciprocative piston means complementing said air cylinder. The piston means is positioned in the path of the mass to engage a portion of the mass as it descends and before it impacts. There is also included means for supplying a fluid, preferably air, to said cylinder for developing an upward force on said piston equalling the force propelling the mass to impact and acting in a direction to oppose the propelling force. After the piston engages the mass, the net force, exclusive of the force generated by the impact, acting on the mass is reduced to zero. Consequently, when the mass rebounds to a raised position above the point of impact, there is acting on it a force preventing it from falling equal and opposite to the force tending to make the mass fall. Thus, the mass remains suspended in the raised position.

The novel features that are considered characteristic of my invention are set forth in the appended claims; the invention itself, however, both as to its organization and method of operation, together with additional objects and advantages thereof, will best be understood from the following description of a specific embodiment when read in conjunction with the accompanying drawings, in which;

MEANS FOR PREVENTING MULTIPLE REBOUND OF AN IMPACT MASS

Description

Figure 1:
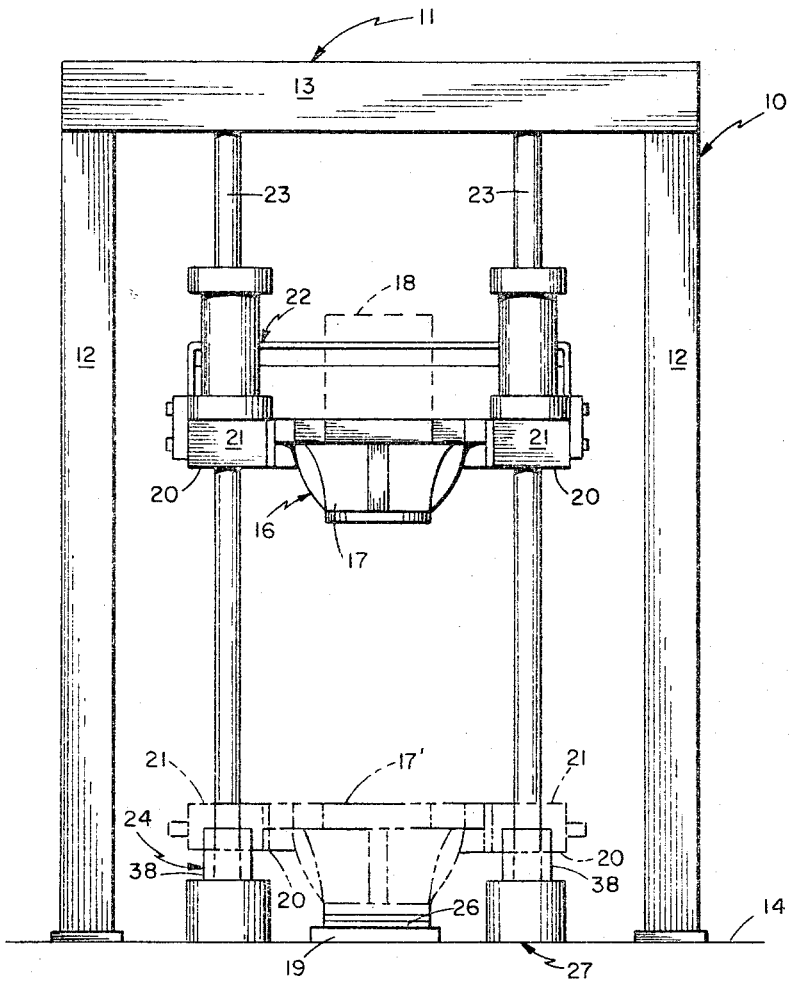
FIGURE 1 depicts a shock testing machine which includes a device for preventing multiple rebounds of the impact mass.

Referring to FIGURE 1 of the drawings, there is shown one type of free-falling shock testing machine 10. The shock testing machine includes a support structure 11 formed from a pair of vertical columns 12 that is joined at the top by a horizontal cross member 13. The support structure 11 is anchored to an immovable member, preferably a floor 14, in some suitable manner, not specifically shown.

The shock testing machine 10 also includes a mass 16 that can be raised above an anvil 19, secured to the floor 14 and dropped on the anvil 19 to subject the mass 16 to a shock impact. The mass 16, as depicted in FIGURE 1, includes a carriage 17 and a test specimen 18 which, in the normal course of events, is mounted to the carriage 17 to test its capabilities to withstand shock impacts. The carriage 17 also includes a pair of laterally extending bearings 21, 21 which includes bottom surfaces 20, 20.

The mass 16 is maintained in an elevated position by a latching mechanism 22 secured to a pair of vertical, horizontally spaced rods 23. The rods 23 pass through the bearings 21 as shown and function to guide the fall of the mass 16 to the anvil 19.

Shown in combination with the shock testing machine is a pair of force generating means 24, 24 which is secured to the floor 14 in some suitable fashion and positioned to engage the mass 16 during the course of its fall to the anvil 19. In FIGURE 1, it is positioned directly below the bearings 21. As will be seen hereinafter, the force generating means 24, 24 encircle the rods 23 and are concentric therewith.

As is well known, the shape of the shock impact can be regulated through the use of energy absorbing devices. Half sine, saw tooth, or square wave shock impacts may be generated at will by using appropriate energy absorbing devices. For purposes of illustration, this discussion will be limited to the half sine wave. Accordingly, there is shown in FIGURE 1 an energy absorbing device 26 comprising a rubber pad positioned on the anvil 19.

*Description of force generating device 24*

Figure 2:
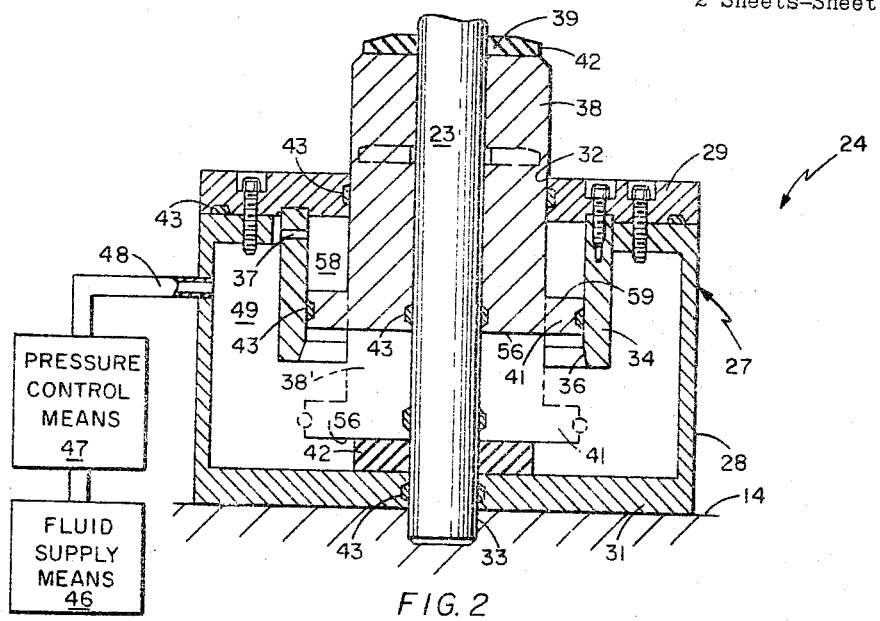
FIGURE 2 is a detailed representation of a device for preventing multiple rebounds of an impact mass embodying the principles of the present invention.

A detail representation of one of the force generating devices 24, 24 is shown in FIGURE 2. The force generating device 24 includes a fluid cylinder 27 defined by a vertically extending peripheral sleeve 28 terminated in closed ends 29 and 31. Both the closed top end 29 and closed bottom end 31 include central holes 32 and 33, respectively.

The force generating means 24 also includes a centrally positioned cylindrical tube 34 defining an inside surface 36 secured to and depending from the top end 29. The cylindrical tube 34 includes transverse passage 37 positioned adjacent to the top end 29.

A reciprocative, cylindrical piston 38 having a central passage 39 and an enlarged flange 41 at the lower end thereof is also provided. Piston 38 is capped by a resilient pad 42. The enlarged flange 41 is dimensioned to slidably engage the inside surface 36 of the depending tube 34. The remainder of the piston 38 is dimensioned to slidably pass through the hole 32 in the top end 29.

The piston 38 is shown in an intermediate position. The phantom outline 38' denotes the lowermost position of its travel. When fully extended, the enlarged flange 41 bears against the top end 29. It is quite obvious that the stroke of the piston 38 is longer than the axial length of the cylindrical ring 34. A resilient pad 42 is interposed between the bottom end 31 and the enlarged flange 41 to prevent a metal-to-metal contact between the piston 38 and the bottom end 31.

The combination of fluid cylinder 27, piston 38 and rod 23 forms a concentric assembly of parts. The rod 23 passes through the passage 39 in the piston 38, through hole 33 in the closed end 31, and is firmly anchored into the floor 14. A number of fluid seals, "O-rings," is illustrated. These are used in a conventional way to prevent the escape of fluid between mating parts. The fluid seals are identified by the symbol 43.

The force generating device 24, in FIGURE 2, also includes means for supplying fluid at an adjustable and predetermined pressure to the fluid cylinder 27. The aforementioned means comprises a fluid supply means 46, a compressor and reservoir, for example, in fluid communication with a pressure control, or regulator, means 47 in fluid communication by means of conduit 48, with a fluid compartment 49 defined by the fluid cylinder 27.

Returning to FIGURE 1 of the drawings, the force generating means 24, 24 are shown with their pistons 38 in a fully raised position. The phantom outline 17' of the carriage is shown in position at the moment of impact. In particular it will be noted that the top of the pistons 38 is substantially higher than the bottom surfaces 20, 20 of the bearings 21, 21. Accordingly, the pistons 38, 38 engage the bearings 21, 21 prior to impact. The significance of this fact will be made clear hereinafter.

*Theory and description of operation*

In a typical test run the mass 16, comprising the carriage 17 and the test specimen 18, is raised above the anvil 19 and subsequently released to drop thereon. The shape of the shock impact that is generated depends on the type of energy absorbing device 26 which is being used. The amplitude of the shock impact is primarily determined by the drop height.

The propelling force in a free-falling machine is generated by gravity and is equal to the weight of the mass 16.

Figure 3:
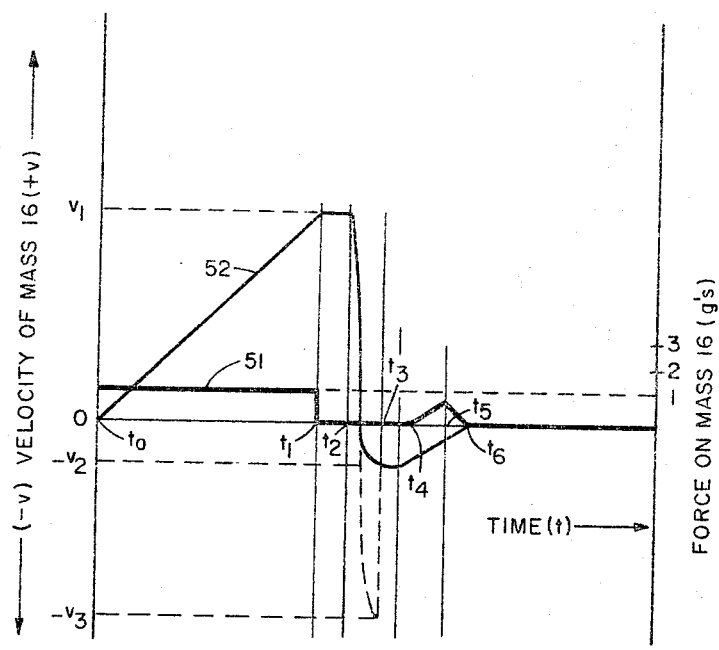
FIGURE 3 is a graphical representation useful in explaining the operation of the invention.

Referring to FIGURE 3 there is depicted a curve 51 of force on the mass 16 as a function of time and a curve 52 of the velocity of mass 16 as a function of time.

During the interval $t_0$ to $t_1$ the mass 16 is falling and is being propelled by the force of gravity as depicted on curve 51. In accordance with the well-known fundamental force equations, the velocity of mass 16 follows a linear relationship during this interval. At time $t_1$ the bearings 21, 21 of the mass 16 strike the extended pistons 38, 38.

Referring to FIGURE 2 of the drawings it is quite obvious that the force acting on the piston 38, in an upward direction, is equal to the pressure of the fluid contained within the fluid cylinder 27 multiplied by the net effective area of the bottom surface 56 of the enlarged flange 41. The net effective area amounts to the cross-sectional area of the piston 38 since upward force on enlarged flange 41 is offset by a downward force acting on the top surface of the enlarged flange 41. As will be shown shortly, it is desired to apply to the mass 16 a neutralizing force equal in magnitude to the propelling force, in this case gravity, but acting in opposition to the propelling force. Since two force generating means 24, 24 are shown in FIGURE 1, the fluid pressure acting against the bottom surface 56 of each is adjusted to generate a force equal to one half the weight of mass 16.

It is well known that the derivative of velocity $v$ with respect to time $t$ is acceleration $a$. Making the proper substitution in the well-known force equation $F=ma$ and further if velocity $v$ is differentiated with respect to time. Equation 1 results:

$$\frac{dv}{dt}=\frac{F}{m} \qquad (1)$$

The interesting conclusion to be reached from Equation 1 is that the rate of change of velocity with time drops to zero if the force acting on a mass drops to zero. In other words, if the mass achieves a state of weightlessness, it continues to move at the velocity it was moving before the net force acting on it was reduced to zero.

It had been mentioned previously that the mass 16 makes contact with the pistons 38, 38 at time $t_1$. Recalling also that the total force, in an upward direction, acting on the pistons 38, 38 has been adjusted to equal the weight of the mass 16, the net force acting on mass 16 after time $t_1$, is equal to zero. See curve 51. In accordance with Equation 1 above, the velocity of mass 16 subsequent to time $t_1$ does not change and continues at $v_1$. See curve 52.

It is well known that to generate a half-sine acceleration impact, the velocity of mass 16 during impact must follow a half cosine curve. If there were no loss of kinetic energy in the mass 16, its velocity would go from $v_1$ to $-v_1$ during the time interval $t_2$ to $t_3$ which corresponds to the time of impact. Under these assumed conditions in an elastic impact the mass 16 would leave the point of impact at a velocity $-v_1$.

In practice, however, approximately ninety percent of the kinetic energy of the mass 16 is absorbed in the energy absorbing device 26. As a result, the velocity characteristic of the mass 16 follows a distorted cosine curve from $v_1$ to $-v_2$ as shown in FIGURE 3. Therefore $-v_2$ is the initial "take-off" velocity of the rebounding mass 16 from the point of impact. It is seen from the force curve 51 that the mass 16 continues in a condition of weightlessness during impact, the forces generated by the impact being ignored, and shortly thereafter to time $t_1$. Accordingly, the velocity of the mass 16 continues, without attenuation at $-v_2$ during the interval $t_3$ to $t_4$.

Assuming this condition continues until the pistons 38 return to their maximum-raised position, it is quite clear that the velocity of the carriage at this time will still be $-v_2$. Looking at it another way, when the pistons return to their fully extended position there remains in the mass 16 a substantial amount of ginetic energy. Accordingly, the mass 16 will tend to fly off the ends of the piston and rebound, possibly develop multiple rebounds on the pistons and/or the anvil 19. This condition can be avoided by decelerating the mass 16 immediately after it impacts and more specifically during the times $t_4$ to $t_6$ in FIGURE 3.

The deceleration effect may be created in any number of ways such as introducing frictional force after impact or by momentarily reducing the neutralizing force, and even eliminating it entirely. The latter method is preferred and will be illustrated. For clarity, the decelerating force will be referred to as a damping force.

The discussion was briefly interrupted at time $t_3$ with the mass leaving the point of impact at a velocity $-v_2$. At time $t_3$ the enlarged flange 41 is positioned below the cylindrical tube 34. Accordingly, the fluid pressure in compartment 49 and in an internal compartment 58, FIGURE 2, defined by the cylindrical tube 34 and a piston 38, are equal. At time $t_4$ the enlarged flange 41 enters the cylindrical tube 34 and continues in an upward direction. In doing so the fluid in the internal compartment 58 is substantially trapped, the only exit for the fluid being through the passage 37. Passage 37 is relatively small and cannot bleed the fluid from the internal compartment 58 instantaneously. As the volume of the internal compartment 58 decreases the fluid pressure increases. This pressure creates a damping force acting in a downward direction on the upper annular surface 59 of the enlarged flange 41. Although the surface area of the annulus 59 is substantially less than the surface area of the bottom surface 56 of the enlarged flange 41, the fluid pressure within the internal compartment 58 is substantially higher than the fluid pressure in the fluid compartment 49. The damping force generated is, therefore substantial and in the extreme it may equal the neutralizing force acting on the bottom surface 56. As a result of the damping force, the net force acting on the mass 16 during the interval $t_4$ to $t_5$ is equal to the force of gravity plus the damping force minus the neutralizing force or, simply, the damping force. Since this acts in a downward direction, the velocity of the mass during the interval $t_4$ to $t_5$ decreases, as shown in FIGURE 3.

During the upward stroke of the pistons 38, 38 fluid leaves the internal compartment 58 via passage 37 and enters the fluid compartment 49 tending to equalize the fluid pressures in these compartments. It is assumed that at time $t_5$, the fluid pressure in the internal compartment 58 reaches its maximum value and thereafter decreases. Accordingly the damping force acting on the mass 16 in the interval $t_5$ to $t_6$ falls to zero. At time $t_6$ the mass 16 is again in a state of weightlessness but at this time it is raised above the point of impact. Under these conditions it remains at rest in the raised position, thus preventing a second and subsequent rebounding of the mass 16.

Heretofore the force generating means 24, 24 were said to be fluid actuated. In practice, a pneumatic system was used. A pair of force generating means 24, 24 was used in connection with a shock testing machine such as shown in FIGURE 1 in which the carriage 17 weighed 1400 lbs. The machine is capable of testing a 500-pound test specimen. The design characteristics of each of the force generating means 24 is as follows:

| Description: | Dimensions |
|---|---|
| Diameter of piston 38 | 5 inches. |
| Diameter of enlarged flange 41 | 6 inches. |
| Typical operating fluid pressure | 55 lbs. per square inch—absolute. |
| Maximum stroke of piston 38 | 6 inches. |
| Typical stroke of piston 38 | 3 inches. |
| Volume of fluid compartment 49 with piston raised | 510 cubic inches. |
| Volume of fluid compartment 49 with piston 38 depressed four inches | 445 cubic inches. |
| Change of fluid pressure in compartment 49 due to change of volume (adiabatic compression) | 35 percent. |

It will be noted that the fluid pressure in compartment 49 changes as the piston 38 is depressed by about 35 percent. Manifestly the change in pressure can be decreased or eliminated by increasing the volume of the fluid compartment 49. This is not necessary, however, it being relatively simple to calibrate the effect of the 35 percent change in fluid pressure and thus the 35 percent change in the neutralizing force. There is sufficient momentum to carry the mass to impact point, and test data indicates there is no deterioration in the shape of the shock impact developed.

This invention also finds application in power-operated impact devices wherein a mass is propelled, by a fluid under pressure, to an impact point. In power equipment the neutralizing force would have to have a magnitude equal to the propelling force developed by the fluid under pressure on the mass, if the propelling force is maintained on the mass during and after impact. On the other hand, if the propelling force is removed at impact, there may still be a residual force such as gravity which must be neutralized.

It is also obvious that the principles embodied in the present invention may be applied to machines where a mass is propelled to impact along a horizontal line, particularly where there is a residual propelling force which would tend to cause the impact mass to rebound repeatedly before coming to rest.

Figure 4:
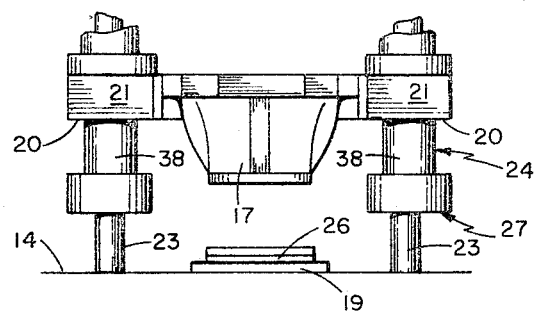
FIGURE 4 depicts a second arrangement of a device for preventing multiple rebounds of an impacting mass.

FIGURE 4 illustrates that the force generating means 24, 24 may be secured to the carriage 17 if desired. The piston 38 is secured to the bearings 21, instead of the fluid cylinder 27, to take advantage of the built-in damping means. Obviously, if external damping means is used, the force generating means 24, 24 may be reversed and the fluid cylinder 27 secured to the bearings 21, 21.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

I claim:

1. In combination with a means for developing a propelling force to propel a mass to impact on an immovable member, a means for preventing multiple rebounds of said mass after the initial impact thereof comprising:
    (a) fluid cylinder means defined by a peripheral sleeve terminated in first and second closed ends, the first end having a central aperture;
    (b) a tube defining an inside surface concentrically secured to said first end including a transverse passage through said tube adjacent to said first end;
    (c) reciprocative piston means including an enlarged flange at one end dimensioned to slidably engage said inside surface of said tube, the other end being dimensioned to pass through the central aperture in said fluid cylinder means, the stroke of said piston being longer than the length of said tube, and said piston being in a position to engage said mass prior to impact to apply a force thereto; and
    (d) means for supplying fluid to said fluid cylinder means for developing a continuous neutralizing force on said flange substantially equalling the propelling force.

2. A combination as described in claim 1 which said fluid is air.

3. In combination with a means for supplying a propelling force to a mass to impact said mass, a means for preventing a multiple rebounding of said mass comprising:
(a) means for applying a neutralizing force to said mass prior to impact and thereafter, said means including; a fluid cylinder, and means for supplying fluid to said fluid cylinder for developing a continuous pressure of predetermined value in said cylinder; and
(b) damping means acting on said mass after impact for reducing the velocity thereof and bringing said mass to rest.

4. In combination with a means for supplying a propelling force to a mass to impact said mass, a means for preventing multiple rebounding of said mass comprising:
(a) means for engaging said mass and for applying a neutralizing force to said mass prior to impact and thereafter, said means including; a fluid cylinder, and means for supplying fluid to said fluid cylinder for developing a continuous pressure of predetermined value in said cylinder; and
(b) damping means acting on said mass after impact for reducing velocity thereof for bringing said mass to rest before the said mass becomes disengaged from said mass engaging means.

5. In combination with a means for supplying a propelling force to a mass to impact said mass, a means for preventing a multiple rebounding of said mass comprising:
(a) means for applying a neutralizing force to said mass prior to impact and thereafter, said means including; a fluid cylinder, and means for supplying fluid to said fluid cylinder for developing a continuous pressure of predetermined value in said cylinder;
(b) damping means for applying to said force applying means after impact a force acting in opposition to the neutralizing force.

6. A means for preventing multiple rebounding of a mass propelled by a propelling force to impact comprising:
(a) means for applying a neutralizing force to said mass prior to impact and thereafter, said means including; a fluid cylinder, and means for supplying fluid to said fluid cylinder for developing a continuous pressure of predetermined value in said cylinder; and
(b) damping means acting on said mass, after impact for reducing the velocity of said mass for bringing said mass to rest.

7. A means for preventing multiple rebounding of a mass propelled by a propelling force to impact comprising:
(a) means for applying a neutralizing force to said mass prior to impact and thereafter, said means including; a fluid cylinder, and means for supplying fluid to said fluid cylinder for developing a continuous pressure of predetermined value in said cylinder; and
(b) damping means for applying to said force applying means after impact a momentary force acting in opposition to the neutralizing force.

8. A means for preventing multiple rebounding between a first mass and a second mass one of which is being propelled by a propelling force, to impact against the other comprising:
(a) means secured to the first mass for applying a neutralizing force to the second mass prior to impact and thereafter, said means including; a fluid cylinder, and means for supplying fluid to said fluid cylinder for developing a continuous pressure of predetermined value in said cylinder; and
(b) damping means acting momentarily on said first mass being propelled after impact for bringing said one mass to rest in a raised position.

9. A means for preventing multiple rebounding between a first mass and a second mass one of which is being propelled by a propelling force, to impact against the other, comprising:
(a) means secured to the first mass for applying a neutralizing force to the second mass prior to impact and thereafter, said means including; a fluid cylinder, and means for supplying fluid to said fluid cylinder for developing a continuous pressure of predetermined value in said cylinder; and
(b) damping means for applying to said force applying means after impact a momentary force acting in opposition to the neutralizing force.

10. A means for preventing multiple rebounding of a mass propelled by a propelling force to impact on an immovable member comprising:
(a) means secured to said immovable member for engaging said mass for applying a neutralizing force to said mass prior to impact and thereafter, said means including; a fluid cylinder, and means for supplying fluid to said fluid cylinder for developing a continuous pressure of predetermined value in said cylinder; and
(b) damping means for applying to said mass engaging means after impact a force acting in opposition to the neutralizing force.

11. In combination with a means for providing a propelling force for impacting a first mass against a second mass, a means for preventing multiple impacts on said mass comprising:
(a) a force generating means comprising fluid cylinder means and complementary, reciprocative piston means extending therefrom both interposed between said masses to engage said masses prior to impact and thereafter; and
(b) fluid supply means for supplying fluid to said fluid cylinder means at a continuous predetermined pressure for applying to said piston means a continuously acting neutralizing force.

12. A combination as described in claim 11 which includes damping means actuated after impact for decelerating said mass.

13. In combination with a means for providing a propelling force for impacting a first mass against a second mass, a means for preventing multiple impacts on said mass comprising:
(a) a force generating means comprising fluid cylinder means and complementary, reciprocative piston means extending therefrom interposed between said masses to engage said masses prior to impact and thereafter;
(b) fluid supply means for supplying fluid to said fluid cylinder means at a continuous predetermined pressure for applying to said piston means a continuously acting neutralizing force; and
(c) means actuated after impact for generating and applying a damping force to said piston means acting in opposition to said neutralizing force for decelerating said mass.

14. A combination as described in claim 13 in which said fluid cylinder means and piston means are dimensioned so that the change of volume of the fluid in said fluid cylinder means and accordingly the change of pressure of the fluid in said fluid cylinder means due to the movement of said piston does not exceed 35 percent.

15. A method of preventing multiple rebounding of a mass propelled to impact which comprises the steps of: providing a force generating device including means for supplying fluid at a continuous pressure of predetermined value
(a) utilizing the force generating device to apply a neutralizing force to the mass prior to impact and thereafter; and
(b) acting on said mass with a damping means after impact to reduce the velocity thereof and bring the mass to rest.

16. A method of preventing multiple rebounding of a mass propelled to impact which comprises the steps of: providing a force generating device including means for supplying fluid at a continuous pressure of predetermined value (a) utilizing the force generating device to apply a neutralizing force to the mass prior to impact and thereafter; and
(b) acting on said mass with a force in opposition to the neutralizing force to produce damping.

17. A method of preventing multiple rebounding of a mass propelled to impact which comprises the steps of: providing a force generating device including means for supplying fluid at a continuous pressure of predetermined value
(a) utilizing the force generating device to apply a continuously acting neutralizing force to the mass prior to impact and thereafter; and
(b) acting on said mass with a damping means after impact to reduce the velocity thereof and bring the mass to rest.

18. A method of preventing multiple rebounding of a mass propelled to impact which comprises the steps of: providing a force generating device including means for supplying fluid at a continuous pressure of predetermined value
(a) utilizing the force generating device to apply a continuously acting neutralizing force to the mass prior to impact and thereafter; and
(b) acting on said mass with a force in opposition to the neutralizing force to produce damping.

References Cited by the Examiner

UNITED STATES PATENTS

| | | | |
|---|---|---|---|
| 825,992 | 7/1906 | Welfley | 188—97 |
| 2,937,865 | 5/1960 | Patterson | 73—12 |
| 3,103,116 | 9/1963 | Kohli | 73—12 |

DUANE A. REGER, *Primary Examiner.*

UNITED STATES PATENT OFFICE
CERTIFICATE OF CORRECTION

Patent No. 3,270,839                          September 6, 1966

Ralph S. Colby

It is hereby certified that error appears in the above numbered patent requiring correction and that the said Letters Patent should read as corrected below.

Column 1, line 34, for "impulser" read -- impulse --; column 2, line 68, for "it is" read -- they are --; column 4, line 66, for "$t_1$" read -- $t_4$ --; line 74, for "ginetic" read -- kinetic --.

Signed and sealed this 26th day of September 1967.

(SEAL)
Attest:

ERNEST W. SWIDER                          EDWARD J. BRENNER
Attesting Officer                             Commissioner of Patents